Patented Apr. 27, 1954

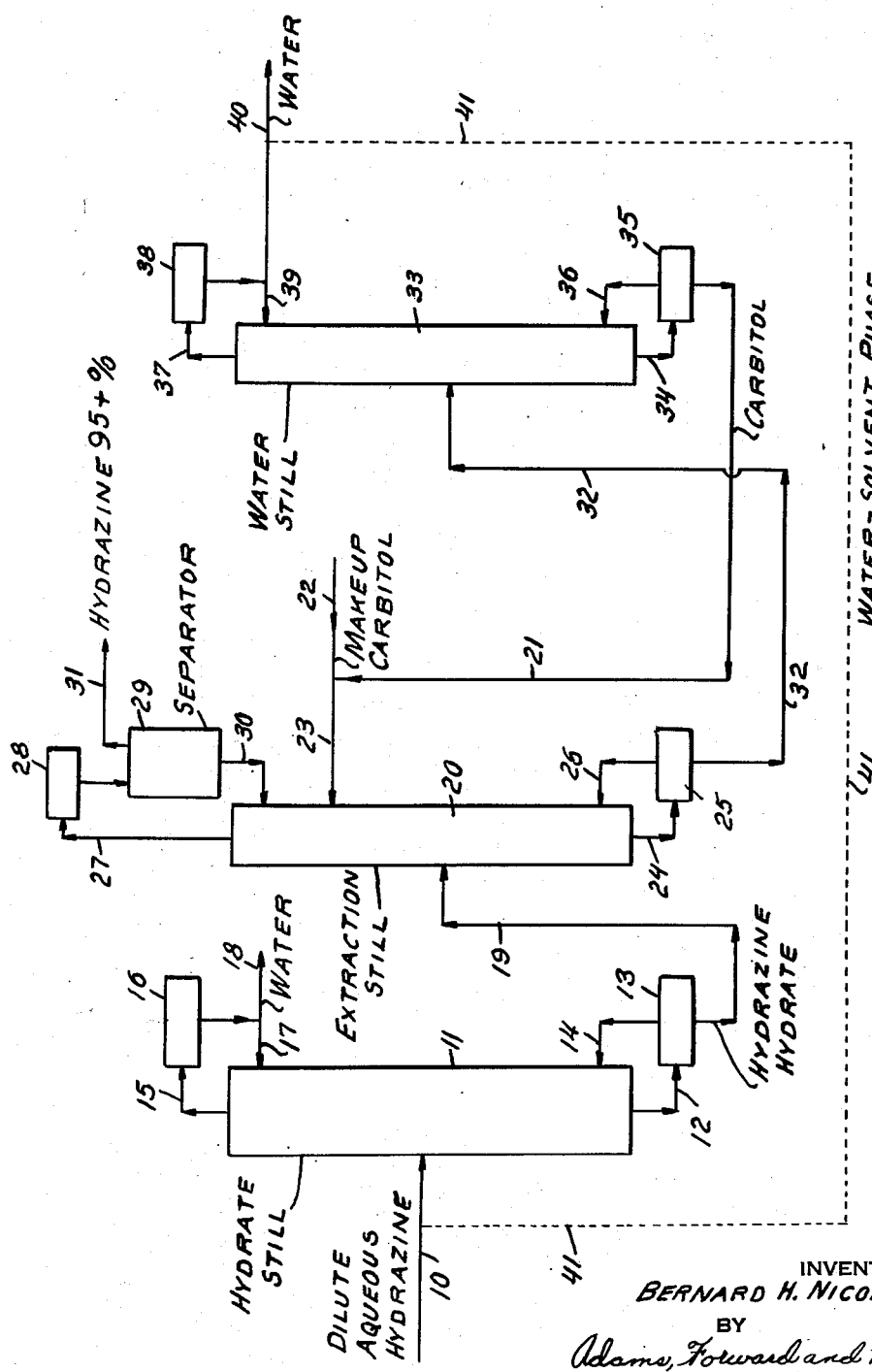

2,676,911

UNITED STATES PATENT OFFICE 2,676,911

PRODUCTION OF ANHYDROUS HYDRAZINE BY EXTRACTIVE DISTILLATION WITH LOWER ALKYL MONOETHERS OF DIETHYLENE GLYCOL

Bernard H. Nicolaisen, Lewiston, N. Y., assignor to Mathieson Chemical Corporation, a corporation of Virginia Application June 4, 1952, Serial No. 291,611

2 Claims. (Cl. 202—39.5)

1

This invention relates to a process for the production of substantially anhydrous hydrazine from dilute aqueous hydrazine solutions by extractive distillation.

In the Raschig synthesis hydrazine is obtained as an extremely dilute aqueous solution (about 1 to 3%) by the distillation of the reaction mixture. In one group of methods for obtaining anhydrous hydrazine from the Raschig product, the base may be absorbed in acid, and the resulting salt after separation from water may be ammonolyzed to obtain anhydrous hydrazine. In another group of processes for the same purpose, the dilute aqueous hydrazine may be fractionated at atmospheric pressure to obtain concentrations up to the azeotropic composition containing 71.5% of hydrazine. Further distillation at atmospheric pressure does not serve to increase the concentration of hydrazine. This so-called hydrazine hydrate may be distilled from caustic soda or other alkalies, usually by multiple distillations, in order to obtain anhydrous hydrazine. These processes are expensive and appreciable hydrazine loss occurs by decomposition on heating over extended periods.

I have found that dilute aqueous hydrazine can be readily concentrated by extractive distillation in the presence of a lower alkyl monoether of diethylene glycol as a solvent. Substantially anhydrous hydrazine can be produced by establishing conditions of extractive distillation such that the bulk of the hydrazine is vaporized from the distillation zone with a minor portion of the solvent while the water plus the bulk of the solvent is removed as the liquid bottoms. The process is particularly advantageous in that the anhydrous hydrazine product is recovered as an overhead product. I have found that diethylene glycol monoethyl ether has special value as an extractive solvent for the distillation. Diethylene glycol monobutyl ether and diethylene glycol monomethyl ether are other lower alkyl monoethers of diethylene glycol which may be employed.

The preferred charge stock for the present invention is hydrazine hydrate or a composition approximating that concentration obtained usually by the atmospheric fractionation of more dilute aqueous hydrazine at atmospheric pressure. Preferably the charge to the process of the present invention contains at least about 60% of hydrazine and not over about 40% of water. Such charge stocks are readily obtained by atmospheric fractionation. More dilute aqueous solutions of hydrazine may be used.

According to the present invention suitable hydrazine hydrate solutions as described above are charged to a distillation column in which the charge is distilled in contact with the lower alkyl monoether of diethylene glycol. The diethylene glycol monoether advantageously is introduced near the top of the column and the aqueous hydrazine may be introduced at a point preferably below the middle of the column. The column is operated under conditions of extractive distillation including elevated temperature with correlative pressure and solvent to charge ratio establishing separation of a vapor fraction comprising anhydrous hydrazine substantially free of water and a liquid fraction comprising solvent and water substantially free of hydrazine. An excess of the diethylene glycol monoether to charge, preferably in countercurrent contact, is employed. Suitable proportions for example of the diethylene glycol monoether to hydrazine hydrate are about 9 to 1.

Heat is conveniently introduced into the bottom of the column by a steam reboiler. Substantially pure hydrazine (95% or better) is taken overhead at a top temperature, for example of about 113° C. at atmospheric pressure. The bottoms from the column comprise the diethylene glycol monoether and water in the proportion of approximately 30 to 1 and minor amounts of hydrazine not usually exceeding about 7%. The temperature at the bottom of the still should be maintained at about 130° C. in order to obtain the maximum yield of hydrazine overhead without contaminating the product by water.

My invention will be further described in connection with the simplified flow plan of the accompanying drawing. In the illustrated flow, a dilute aqueous hydrazine stream from the synthesis reaction is charged by means of connection 10 to hydrate still 11. Distillation is effected by means of reboiler 13. Hydrazine hydrate is withdrawn as bottoms through connection 12 to reboiler 13. Recirculation to the bottom of still 11 through vapor return line 14 maintains a still bottom temperature of about 122° C., for example. The still top temperature is 100° C. at sea level atmospheric pressure and the water vapor is taken overhead through connection 15 and condenser system 16. Reflux may be returned to the top of the still through connection 17 while the net water removed is withdrawn through connection 18.

The hydrazine hydrate produced is withdrawn from reboiler 13 through line 19 and is charged to extractive still 20. Diethylene glycol monoether comprising recycle material from line 21 and make-up material added by connection 22 is introduced to an upper portion of extractive still 20 by means of connection 23. A still bottom temperature of about 130° C. is maintained by recirculating bottoms through line 24, reboiler 25 and return line 26. A vapor stream is taken overhead through connection 27 and condenser 28 to separator 29. Advantageously, the overhead consists of a mixture of hydrazine and a minor portion of the diethylene glycol monoether. Since the two products are completely immiscible, the liquid condensate entering separator 29 separates into two layers. The lower diethylene glycol monoether layer is returned to the top of the still by connection 30 as a reflux to control the top temperature at about 113° C. The upper layer which is substantially anhydrous hydrazine is removed by line 31 to product storage.

The bottoms from the extractive still 20 consisting substantially of water and the diethylene glycol monoether are removed from reboiler 25 through line 32 to water still 33. The water stripping still is heated by circulation of diethylene glycol monoether bottoms through line 34 to reboiler 35 equipped with return line 36. The bottoms product stream comprising substantially pure diethylene glycol monoether is recycled by means of line 21 from reboiler 35 to extractive still 20. Water vapor is removed overhead through line 37 and condenser 38. Reflux may be returned to the top of the still by connection 39 and the net water removed is withdrawn from the system through line 40. If hydrazine appears in the still overhead to an extent justifying its recovery by rerunning, it may be returned as indicated by dotted line 41 to the hydrazine hydrate still. In the operation of the water still 43, the still top temperature is substantially 100° C. at sea level atmospheric pressure or at correspondingly lower temperatures for lower pressures. The still bottom temperature may be maintained at about 195° C.

In the hydrazine extractive distillation column, nitrogen or other inert gas is preferably introduced as a blanket to prevent introduction of air to the anhydrous hydrazine condensate. Suitable inert gases besides nitrogen include, helium, sulfur hexafluoride and the like.

I claim:

1. A process for the production of substantially anhydrous hydrazine from aqueous hydrazine which comprises subjecting the aqueous hydrazine charge to extractive distillation with a solvent which is a lower alkyl monoether of diethylene glycol under extractive distillation conditions of elevated temperature, pressure and solvent-to-charge ratio establishing separation of a vapor fraction comprising hydrazine substantially free of water and a liquid fraction comprising said solvent and water substantially free of hydrazine.

2. The process of claim 1 in which the vapor fraction contains a substantial proportion of said solvent which is returned to the column as reflux after separation from the hydrazine by condensation and settling.

References Cited in the file of this patent

UNITED STATES PATENTS

| Number | Name | Date |
|---|---|---|
| 1,974,069 | Greer | Sept. 18, 1934 |
| 2,413,205 | Word et al. | Dec. 24, 1946 |

FOREIGN PATENTS

| Number | Country | Date |
|---|---|---|
| 563,164 | Great Britain | Aug. 6, 1944 |